Aug. 2, 1949.  H. E. ALTGELT  2,478,072
HAY LOADER

Filed May 19, 1944  5 Sheets-Sheet 2

INVENTOR.
Herman E. Altgelt,
BY John P. Smith
Atty.

Aug. 2, 1949.    H. E. ALTGELT    2,478,072
HAY LOADER

Filed May 19, 1944    5 Sheets-Sheet 4

INVENTOR.
*Herman E. Altgelt,*
BY *John P. Smith*
Atty.

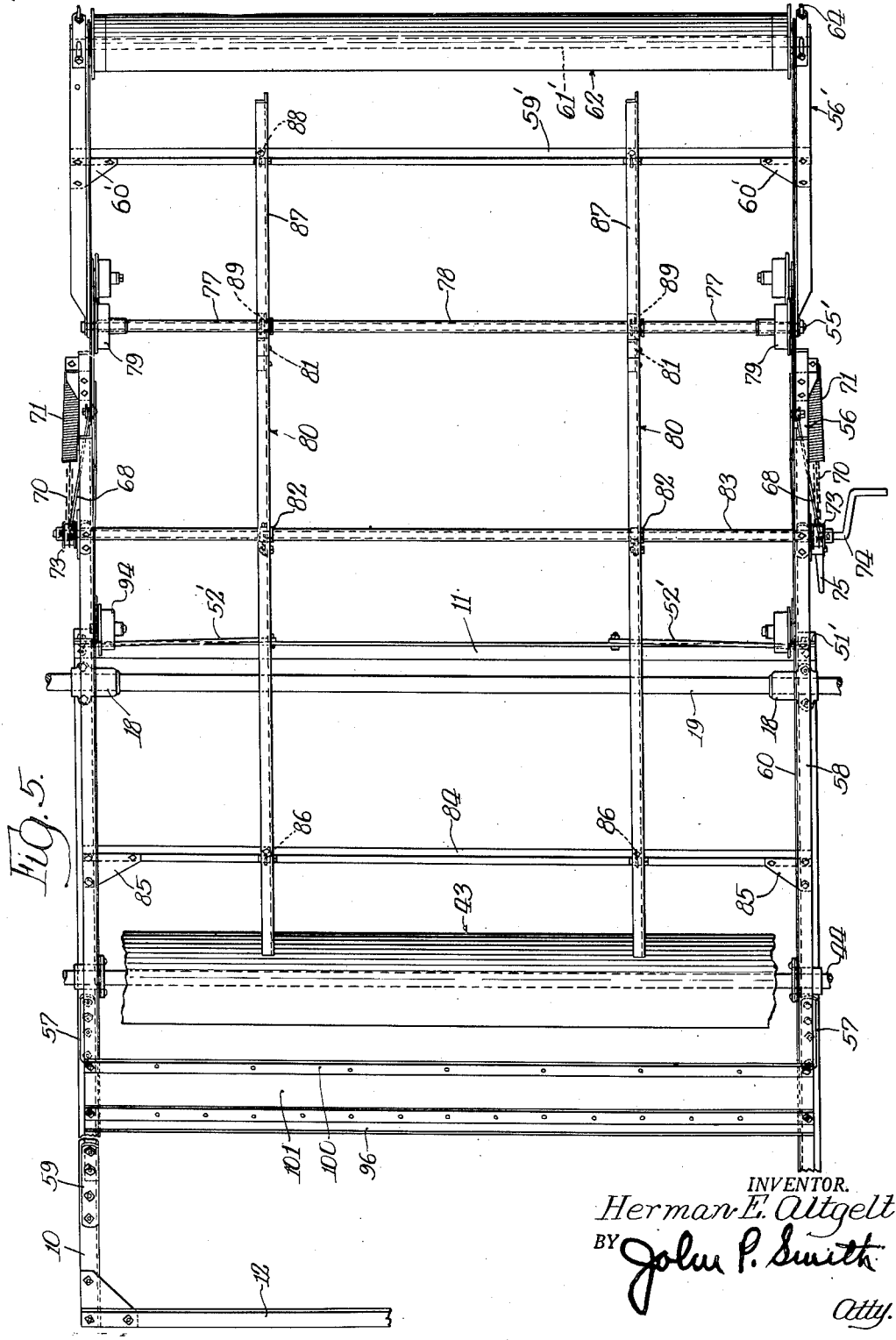

Patented Aug. 2, 1949

2,478,072

UNITED STATES PATENT OFFICE 2,478,072

HAY LOADER

Herman E. Altgelt, South Bend, Ind., assignor to The Oliver Corporation, a corporation of Delaware Application May 19, 1944, Serial No. 536,374

3 Claims. (Cl. 56—345)

The present invention relates generally to hay loaders, but more particularly to a novel and improved construction which is not only light in weight and compact, but is also extremely light in draft and one which is especially adaptable for the purpose of loading crops in a much more gentle fashion than the conventional loader so as to prevent as much as possible the tearing off or shattering of leaves and seeds of hay and prevent the injury to such crops as the pods of green peas when used for the purpose of loading green or similar materials.

Another object of the invention is to provide a novel and improved hay loader in which the loader proper is supported on relatively small traction wheels which operatively drive the pick-up reel located on an axis rearwardly with respect to the axis of the traction wheels and operatively driven at a relatively faster speed than the revolution of the drive wheels.

A further object of the invention is to provide a novel and improved hay loader construction supported at its front end on relatively small traction wheels and at its rear end on adjustable caster wheels with the pick-up reel located approximately in the center between the front and rear wheels. This construction affords a compact and relatively short longitudinal frame structure so that the elevator thereof may be hitched in close proximity to the hay rack so as to place the pivoted extension of the loader in a position to discharge the hay at a point a substantial distance forwardly with respect to the rear end of the hay rack.

A still further object of the invention is to provide a novel and improved hay loader in which relatively smaller traction wheels are employed and so geared to the pick-up and elevating mechanism to thereby drive them at a relatively faster speed than the conventional loader and consequently elevate the material more uniformly and smoothly. The arrangement of the wheel construction is such that turning is facilitated at the ends of the field since the wheels of the hay loader do not interfere or strike the sides of the hay rack which occurs in the conventional loader of the large wheel type.

A still further object of the invention is to provide a novel and improved construction of hay loader with the pick-up reel located intermediate the front traction and rear caster wheels so as to permit adjustment of the position of the reel with respect to the ground.

These and other objects are accomplished by providing a construction and an arrangement of the various parts in the manner hereinafter described and particularly pointed out in the appended claims.

Referring to the drawings:

Fig. 5 is a fragmentary top plan view of the elevating frame with endless conveyor removed.

Figure 3:
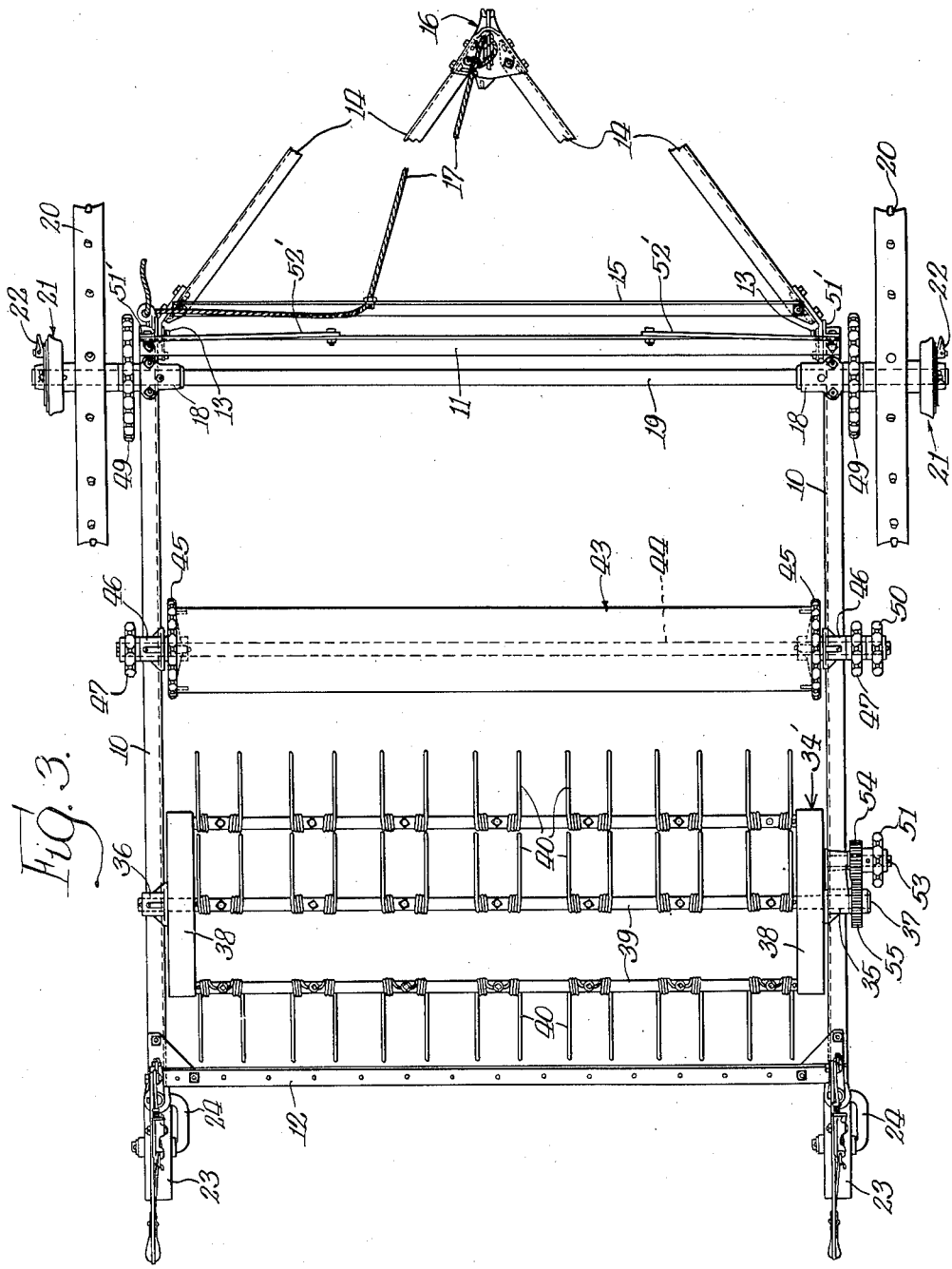
Fig. 3 is a top plan view of the main frame with the elevator frame removed therefrom.

In illustrating one form of my invention, I have shown the same as comprising two longitudinally extending main frame members 10 which have their forward ends connected by a main front transverse frame member 11. The rear ends of the main frame member 10 are connected by a second transverse rear frame member 12. Pivotally connected to the forward ends of the opposite main frame members 10 as shown at 13 is a draft frame which includes two forwardly converging angle members 14 and a transverse draft frame member 15. Connected to the forward ends of the draft frame members 14 is a conventional form of spring actuated latch coupling connection, generally indicated by the reference character 16. This latch or coupling connection is controlled by means of a rope 17, which extends to within easy reach of the operator on the hay rack. Journaled in suitable bearings 18 secured to the opposite main frame members 10 is a shaft or axle 19. Journaled on and adjacent the opposite ends of the axle 19 are traction wheels 20. Mounted on the outer ends of the axle 19 are conventional forms of clutch mechanisms generally indicated by the reference character 21. Each of the clutches is provided with a trip control lever 22 for clutching the wheels 20 to the main axle 19. Supporting the rear end of the main frame are oppositely disposed and adjustable caster wheels 23 which are journaled on the conventional type of angularly disposed caster wheel axles 24. The vertically extending shank portions 25 of these caster wheel axles are journaled in vertically extending sleeves or caster wheel brackets, generally indicated by the reference character 26. The brackets 26 are rigidly secured by means of bolts 27 to the frame members 10 and 12. Each of the sleeves or brackets 26 have intermediate and enlarged chambers and the intermediate portions of the vertical shanks 25 are provided with transversely extending pins 28. These pins 28 are adapted to engage the constricted lower bearings 28' so as to prevent displacement of the furrow wheels and axles with respect to the brackets 26 when the loader is moving over uneven ground. Formed integrally with the upper ends of the brackets 26 is a lever sector 29. Pivoted to the sectors 29, as shown at 30, are levers 31. Each lever 31 is provided with the usual dentent mechanism generally indicated by the reference character 32. Pivotally connected to the levers 31 are push rods 33. The lower ends of the push rods 33 are adapted to contact the upper ends of the vertical shanks 25 of the wheel axles 24 as shown at 34 to effect adjustments of these caster wheels with respect to the main frame. Positioned between the front drive wheels 20 and the rear caster wheels 23 is my improved pick-up reel, generally indicated by the reference character 34'. This pick-up-reel comprises a transverse shaft 37 which is journaled in suitable bearings 35 and 36 secured to the opposite frame members 10. Secured to the opposite ends of the shaft 37 inside the frame members 10 are bar castings 38. Located in aligned recesses or apertures in the opposite reel castings 38 are four equally spaced apart tine pipes or bars 39. The tine bars have rigidly secured thereto at uniformly spaced intervals throughout their lengths, the usual spring tines or fingers 40. Secured to one end of each of the bars 39 is a curved crank arm 41. These curved arms 41 revolve with the reel and during the lower cycle of their movement engage a cam 42 which is arcuate in formation and is secured to one of the frame members 10. The arms 41 are adapted to successively engage the cam 42 when the tines 40 are traveling through the lower and forward arc of their cycle of operation so as to project these tines substantially radially to engage and lift the hay to the elevating and conveying mechanism hereinafter described. During the remaining part of their cycle of operation, the tines travel in the plane or planes substantially tangent to the periphery of the reel. The tines are free to assume this tangent position because the curved arms 41 of each of the tine bars 39 do not engage the cam 42 during this portion of the cycle of operation of the reel. Located midway between the pick-up reel and the front axle 19 is a lower elevator roller generally indicated by the reference character 43. (See Fig. 3 of the drawings.) The roller 43 in the form of a metal cylinder is secured to a shaft 44 through the medium of flanged sprocket wheels 45 which are secured to and located adjacent the ends of the shaft 44. The opposite ends of the shaft 44 are journaled in bearings 46, which in turn, are secured to the side frame members 10. Secured adjacent the opposite ends of the shaft 44 are sprocket wheels 47, which in turn, are geared by means of chains 48 to two drive sprocket wheels 49. The sprocket wheels 49 are rigidly secured to the main shaft 19 and are adapted to be driven by the traction wheels 20 when these wheels are clutched to the shaft through the medium of the clutch mechanisms 21. Positioned outside one end of the sprocket wheels 47 and secured to the shaft 44 is a second sprocket wheel 50. The sprocket wheel 50 is geared to a sprocket wheel 51 by means of a chain 52. The sprocket wheel 51 is journaled on a stub shaft 53, which in turn, is secured to the bearing bracket 35. Formed integrally with the sprocket wheel 51 is a pinion 54. The pinion 54 is geared to and operatively drives a pinion or gear 55 secured to the reel shaft 37.

From the above description it will be readily seen that the lower elevator roller 43 is driven directly from each of the traction wheels 20 and that the pick-up reel is driven from one side of the roller shaft 44. In this connection it will also be noted that since the sprocket wheels mounted on the main axle 19 are relatively larger than those on the elevator roller and pick-up reel, the speed of these operating parts will be relatively faster than the travel forward of the loader proper.

Figure 1:
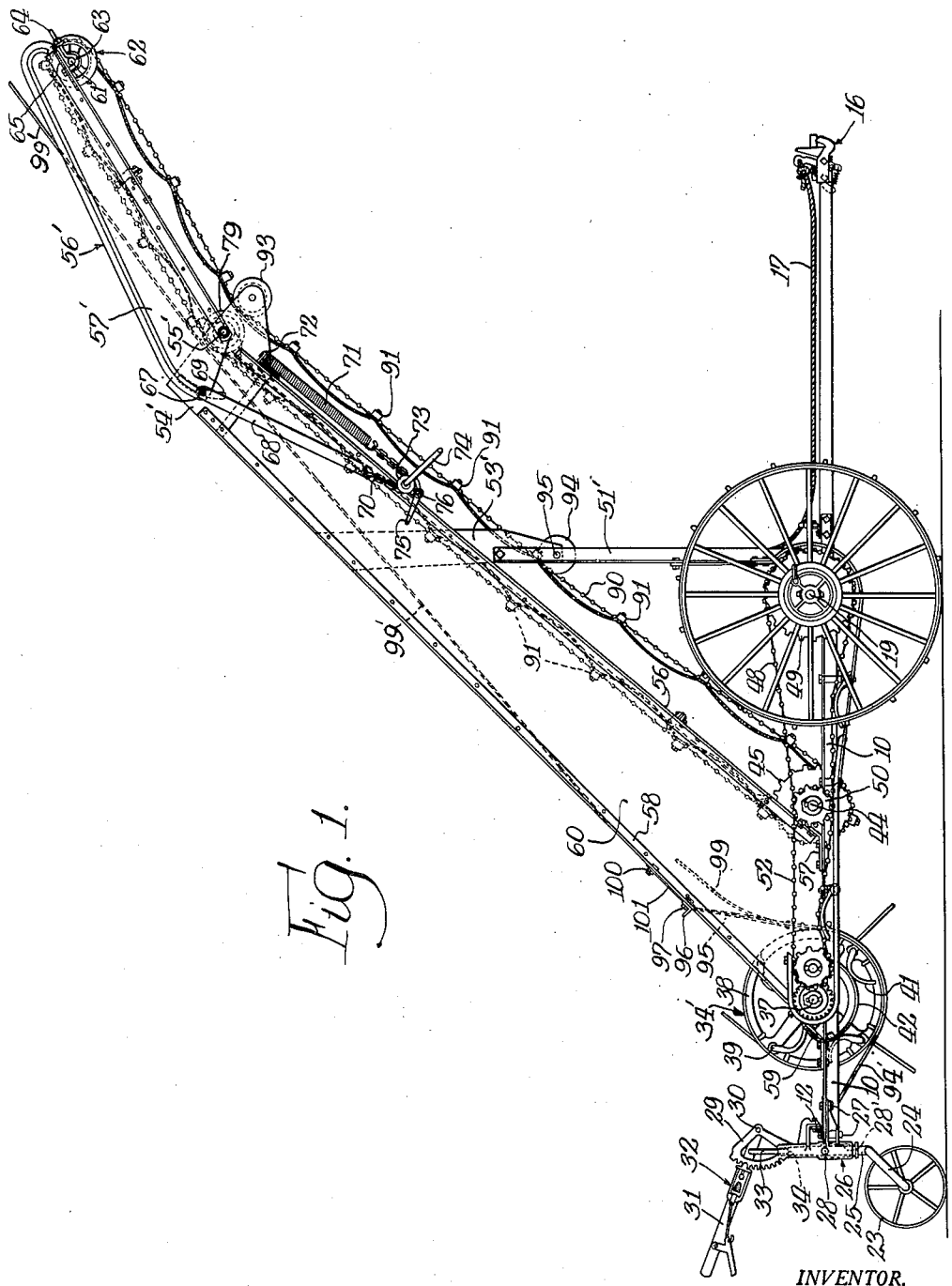
Fig. 1 is a side elevational view of my improved hay loader.
Figure 4:
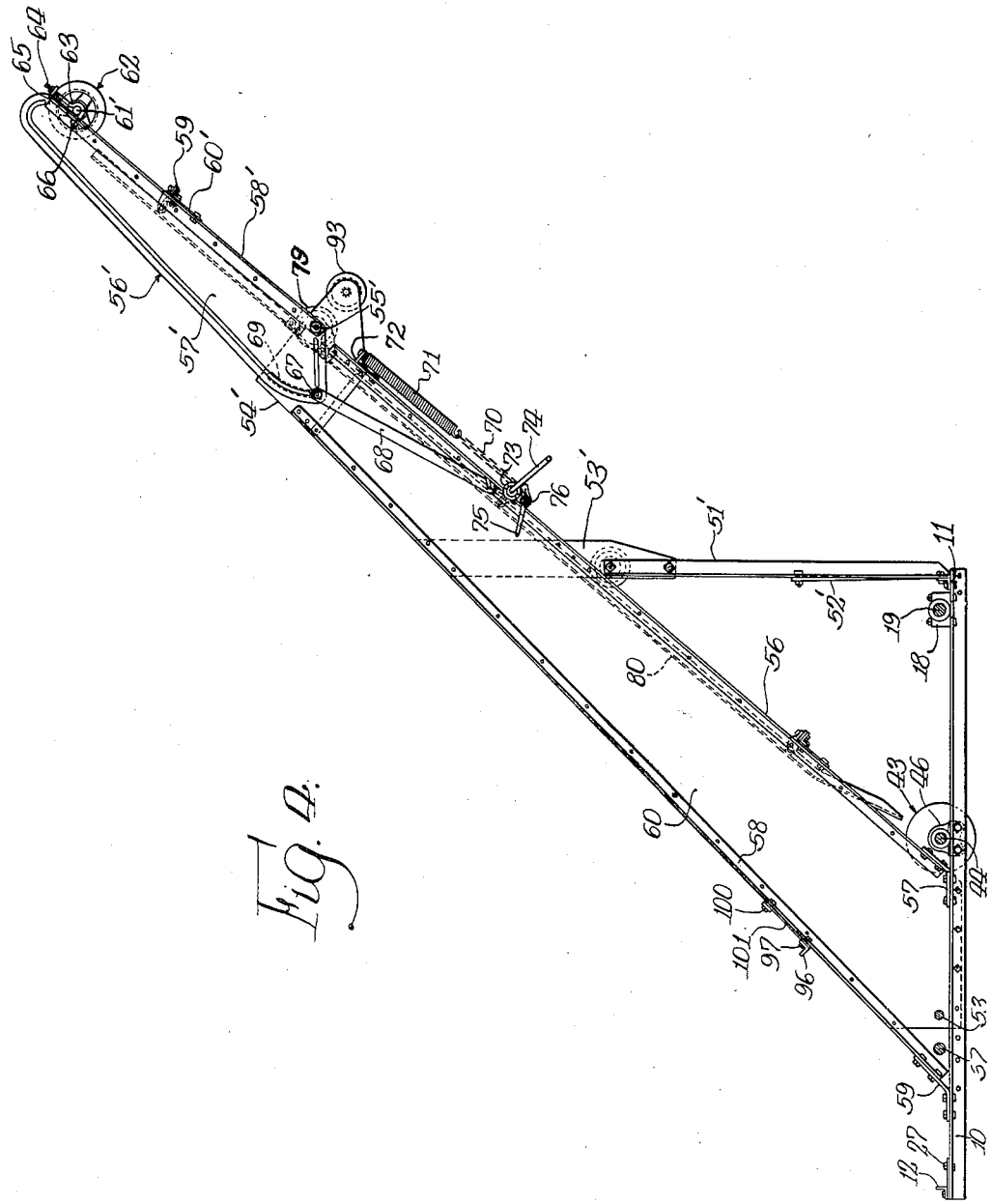
Fig. 4 is a side elevational view of the elevator and conveyor frame with certain parts removed for the purpose of clearness.

My improved elevating and conveying mechanism which is adapted to elevate and load the material more gently and evenly than the conventional loaders heretofore used, comprises upwardly inclined side frame angle members 56 which have their lower ends secured to the opposite longitudinal side frame members 10 by means of brackets 57. (See Fig. 4 of the drawings.) Spaced rearwardly from and converging slightly towards the upper end thereof with respect to the elevator frame members 56 are a second set of oppositely disposed angle frame members 58 which have their lower ends extending from a point adjacent the axis of the pick-up reel and secured to the opposite side frame members 10 by means of brackets 59. Positioned between each of the respective elevator frame members 56 and 58 are sheet steel sides 60 which extend substantially throughout the length of these frame members. The forward end of the elevator frame is supported on the main frame by vertically extending angle members or posts 51' which have their lower ends secured to the opposite ends of the main frame member 11 and braced by diagonal braces 52'. The upper ends of each of the posts 51' are rigidly secured to the opposite side frame members 56 and 58 by means of plates 53'. Secured to the upper ends of the side frame members 56 and 58 are plates 54'. Pivotally connected to the opposite plates 54' on a relatively long bolt 55' is an elevator extension generally indicated by the reference character 56'. This elevator extension 56' comprises two oppositely disposed sheet metal sides 57' which are reinforced by longitudinally extending angle members 58'. The angle members are reinforced or braced by a transverse angle brace 59' and triangular corner brace 60'. Adjustably secured adjacent the upper ends of each of the extension frame members 58' is a roller shaft 61' on which is journaled a roller, generally indicated by the reference character 62 over which an endless conveyor belt hereinafter described is trained. The opposite ends of the shaft 61' and roller 62 are adjustably secured for taking up the tension on the endless belt by hook bolts 63. These bolts have their rear ends threaded as shown at 64 and extend through apertured ears formed on brackets 65, which in turn, are secured to the upper ends of each of the side frame members 58'. The rear ends of the hook bolts as shown at 66 are also threaded and extend through slots located in the rear ends of the brackets 65 for securing the shaft in position after once adjusted. (See Figs. 4 and 5 of the drawings.) Pivotally connected to the rear ends of the sheet metal extensions 57' by means of shoulder bolts 67 are links 68. The shoulder bolts extend through arcuate slots 69 in the plates 54' for limiting the pivotal movement of the extension 56' with respect to the elevator frame proper. The rear ends of the links 68 are connected by chains 70 to balancing springs 71. The other ends of the springs are connected to brackets 72, which in turn, are connected to the upper ends of the side frame members 56. An intermediate portion of each of the chains are trained about rollers 73 which have their periphery complimentary to the chain formation so that the chain may be actuated by the rotation of the rollers. These rollers are secured to the opposite ends of a crank shaft 74 so that the handle thereof may be manually operated for lowering the elevator extension 56'. The elevator extension is located in various positions of adjustment by a manually operated pawl 75 which is pivoted at 76 to a bracket (not shown), carried by one of the side frame members 56. The locking portion of the lever is adapted to engage the chain for supporting the extension in adjusted position. From the above it will be seen that should the operator desire to lower the extension 56' when the hay rack is empty or partially empty, this is accomplished by disengaging the pawl 75 and turning the crank 74 in a clockwise direction as viewed in Fig. 1 of the drawings. Should it be necessary to raise the extension as the hay rack fills with hay, this is accomplished by merely raising the upper end of the extension 56' from the position on the hay rack as the balance spring 71 only partially overcomes the weight and the lever lock 75 will automatically lock the extension to whatever position the extension is raised.

Mounted on the bolt 55' are tubular sections or spacers 77 and 78. Journaled on the outer ends of the spacers 77 are flanged idle rollers or wheels 79 over which the upper lap of the endless conveyor, hereinafter described, travels. Located below the upper lap of the endless conveyor are slide rails, generally indicated by the reference character 80. These slide rails are positioned inwardly from the side of the elevator frame and are supported in their respective positions at their upper ends by brackets 81. The brackets 81 are mounted on the bolt 55' between spacer pipes 77 and 78. An intermediate portion of the slide rails 80 are supported by means of brackets 82. The brackets 82 are secured to a pipe 83 which in turn forms a bearing for the crank rod 74. The pipe 83 is secured to the frame members 56 by suitable brackets. The lower flanges of the angle members or slide rails 80 are supported adjacent the roller 43 by a transverse angle bracket 84 which has its opposite ends secured at the opposite elevator frame members 56 by triangular plates 85. (See Fig. 5 of the drawings). The slide rails are secured to the brace 84 by brackets 86. The elevator extension 56' is provided with parallel slide rails 87 formed in the extension of the slide rails 80. The upper portion of these slide rails 87 are secured to transverse frame member 59' by brackets 88. The lower ends of the slide rails 87 are pivotally attached to the brackets 81 and bolt 55' by hinge brackets 89.

Figure 2:
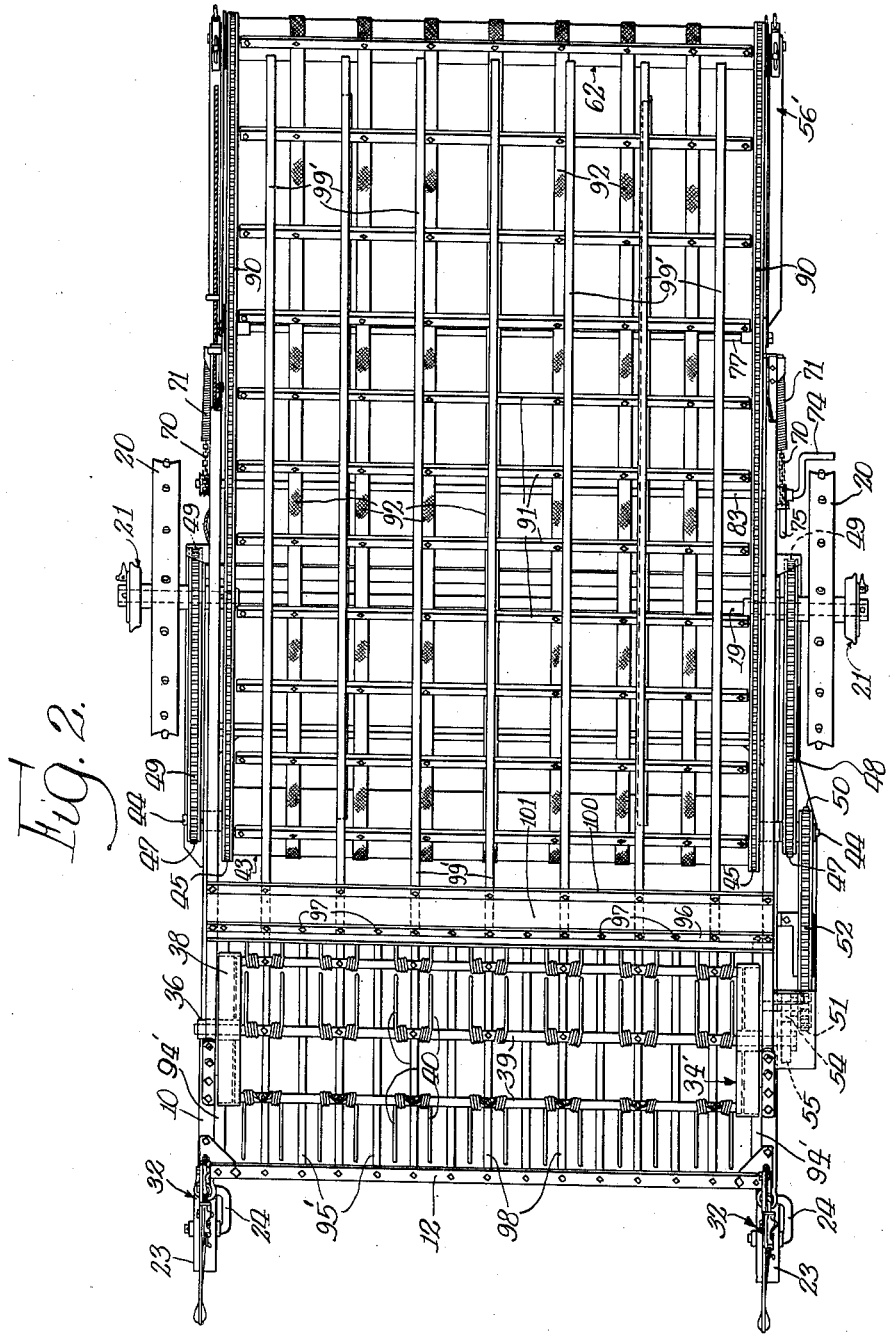
Fig. 2 is a top plan view of the same.

The endless elevator band or belt employed in my improved hay loader comprises two endless sprocket wheel chains 90, which are trained about the opposite sprocket wheels 45 forming part of the lower roller 43. (See Figs. 1 and 2 of the drawings.) Secured at uniform intervals throughout the length of these endless chains 90 are transverse wood slats 91. Secured to the slats 91 at uniform intervals across their lengths are woven or fabric endless elevator bands or belts 92. This endless elevator band or belt is adapted to have its upper lap travel or slide over the slide rails 80 and extension 87 and around the upper roller 62. The lower laps of the chains 90 are trained about oppositely disposed flanged wheels 93 journaled on suitable studs carried by the plates 54'. Journaled on the opposite plates 53' and posts 51' are a second pair of flanged rollers 94 journaled on studs 95.

Surrounding and embracing the reel castings 38 are curved stripper bars 94' which have their rear ends secured to the transverse frame member 12 and their forward ends secured to a cross frame angle member 96. The opposite ends of the member 96 are secured to the opposite elevator frame members 58. Embracing the lower and forward portion of the reel 34' are six equally spaced apart curved stripper bars 95' which have their rear ends secured to the transverse frame member 12 and their forward ends secured to the transverse frame member 96 as shown at 97. Located between each of the adjacent stripper bars 95' are similar curved stripper bars 98. The rear ends of the stripper bars 98 are secured to the transverse frame member 12 and their forward ends are secured to the cross member 96. Riveted to the stripper bars 98 are upwardly and forwardly curved extensions 99 which terminate at points substantially over the elevator roller 43 for guiding the hay in its upward travel. Located in longitudinal alignment with the stripper bars 98 and extensions 99 are longitudinally extending and upwardly inclined pressure bars 99'. The lower ends of these pressure bars 99' are secured to the transverse frame member 96 and to a second transverse frame member 100, the latter of which is spaced forwardly and upwardly from the member 96 and has its opposite ends secured to the opposite side frame members 58. The pressure bars 99' extend upwardly throughout the length of the elevator and its extension 56' and their upper ends rest and are adapted to rest upon the endless conveyor so that they may float up and down in depressing and guiding the hay on the conveyor belt. Extending between the two members 96 and 100 is a sheet metal guard plate 101. (See Fig. 1 of the drawings.) This plate 101 guides the hay in its upward movement so that it will be retained under the pressure bars 99' as the hay is being discharged and elevated by the pick-up reel located at the rear of the loader.

Summarizing the advantages and functions of operation of my improved hay loader, it will be readily seen that by having the drive wheels located ahead of the elevator roller and pick-up reel, and by having this pick-up and elevating mechanism driven at a relatively faster speed than the forward travel of the loader over the ground, that I have provided a construction which will insure a more efficient and smoothly operated pick-up and elevating mechanism as well as one which will effect a continuous and uniform flow of the material being elevated. The compact arrangement of all the operating parts together with the employment of relatively small traction wheels permits the loader to be connected to the hay rack in close proximity thereto without interference on turning at the ends of the field.

It will also be observed that the rear end of the loader frame is capable of floating movement with respect to the rear caster wheels so that when the pick-up reel strikes an obstruction or ridge in the ground, it may yield upwardly without causing injury to the real structure or tines carried thereby.

It will be further noted that by positioning the lower elevator roller and pick-up reel with their respective axes in substantially the same horizontal plane and between the front drive and rear caster wheels assures a more efficient and smoothly operating gathering and elevating means and also shortens the length of the loader to facilitate unobstructed turning at the ends of the field. This arrangement also reduces the weight of the loader with a consequent reduction in the draft thereof.

While in the above specification I have described one embodiment which my invention may assume in practice, it will of course be understood that the same is capable of modification and that such modification may be made without departing from the spirit and scope of the invention as expressed in the following claims.

What I claim as my invention and desire to secure by letters patent is:

1. A hay loader comprising a main frame, traction wheels journaled on the front end of said main frame, caster wheels journaled on the rear end of said frame, an elevator frame mounted on said main frame having its material receiving end positioned rearwardly of the axis of said traction wheels, an endless conveyor mounted on said elevator frame, conveyor sprocket wheels journaled on said frame about which said conveyor is trained, the axes of certain of said sprocket wheels being located in the same horizontal plane with the axis of said traction wheels, a pick-up reel journaled on said main frame and positioned rearwardly of said elevator, stripper bars secured to said main frame and extending around a portion of the periphery of said reel, said stripper bars having attached thereto curved extensions with their forward free ends yieldingly suspended over the receiving end of said elevator, pressure bars having their rear ends secured to said elevator frame and their upper ends freely resting on said conveyor, and means for driving said conveyor and said reel from said traction wheels.

2. A hay loader comprising a main frame, traction wheels journaled on the front end of said main frame, caster wheels journaled on the rear end of said main frame, an elevator frame mounted on said main frame having its material receiving end positioned rearwardly of the axis of the traction wheels, an endless conveyor mounted on said elevator frame, a pick-up reel journaled on said main frame and positioned rearwardly of said elevator, spaced apart stripper bars extending around a portion of the periphery of said reel and having their rear ends secured to said main frame, the forward ends of said stripper bars having attached thereto forwardly curved extensions being yieldingly suspended and terminating over the receiving end of said elevator, longitudinally extending pressure bars having their rear ends secured to said elevator frame and their forward ends freely resting upon said conveyor, and means for driving said conveyor and reel from said traction wheels.

3. A hay loader comprising a main frame, traction wheels journaled on the front end of said main frame, caster wheels journaled on the rear end of said main frame, an elevator frame mounted on said main frame having its material receiving end positioned rearwardly of the axis of said traction wheels, an endless conveyor mounted on said elevator frame, a pick-up reel journaled on said main frame and positioned rearwardly of said elevator, spaced apart stripper bars extending around a portion of the periphery of said reel and having their rear ends secured to said main frame and their forward ends secured to said elevator frame, supplemental stripper bars positioned between said first named stripper bars and having attached thereto forwardly curved extensions with their forward free ends suspended and terminating over the receiving end of said elevator, longitudinally extending pressure bars having their rear ends secured to said elevator frame and their forward ends freely resting upon said conveyor, and means for driving said conveyor and reel from said traction wheels.

HERMAN E. ALTGELT.

REFERENCES CITED

The following references are of record in the file of this patent:

UNITED STATES PATENTS

| Number | Name | Date |
|---|---|---|
| 1,361,302 | Bowers | Dec. 7, 1920 |
| 1,893,506 | Oppenheim | Jan. 10, 1933 |
| 1,936,603 | Larson | Nov. 28, 1933 |
| 2,297,310 | McClellan | Sept. 29, 1942 |